US010079080B2

(12) United States Patent
Coderre (10) Patent No.: US 10,079,080 B2
(45) Date of Patent: Sep. 18, 2018

(54) COATED WIRE (71) Applicant: Marmon Aerospace & Defense LLC, Manchester, NH (US)

(72) Inventor: Kevin David Coderre, Plainfield, CT (US)

(73) Assignee: Marmon Aerospace & Defense LLC, Manchester, NH (US)

( * ) Notice: Subject to any disclaimer, the term of this patent is extended or adjusted under 35 U.S.C. 154(b) by 117 days.

(21) Appl. No.: 15/187,297

(22) Filed: Jun. 20, 2016

(65) Prior Publication Data

US 2017/0365374 A1  Dec. 21, 2017

(51) Int. Cl.
*H01B 7/02* (2006.01)
*H01B 13/14* (2006.01)
*H01B 3/44* (2006.01)
*H01B 3/36* (2006.01)
*H01B 7/28* (2006.01)
*H01B 7/29* (2006.01)
*B64D 47/00* (2006.01)
*B64D 43/00* (2006.01)
(Continued)

(52) U.S. Cl.
CPC ........... *H01B 7/0225* (2013.01); *B64D 47/00* (2013.01); *H01B 3/36* (2013.01); *H01B 3/445* (2013.01); *H01B 7/2806* (2013.01); *H01B 7/29* (2013.01); *H01B 13/141* (2013.01); *B64C 1/00* (2013.01); *B64D 27/18* (2013.01); *B64D 43/00* (2013.01)

(58) Field of Classification Search
CPC ..... F16D 66/00; F16D 66/024; H01B 7/0225; H01B 13/141; H01B 3/445; H01B 3/36; H01B 7/2806; H01B 7/29; B64D 43/00; B64D 47/002; B64D 27/18; B64C 1/00
See application file for complete search history.

(56) References Cited

U.S. PATENT DOCUMENTS 8,518,535 B2 *  8/2013  Fukuda .................. H01B 3/301
                                                             174/120 C
2005/0252679 A1  11/2005  Chang et al.
(Continued)

FOREIGN PATENT DOCUMENTS

DE  102009032774 A1 * 12/2010 ........... F16D 66/024
WO        9831022 A1    7/1998

OTHER PUBLICATIONS

Sep. 21, 2017—International Search Reprot & Written Opinion—App PCT/US17/38361.

*Primary Examiner* — Robert Deberadinis
(74) *Attorney, Agent, or Firm* — Banner & Witcoff, Ltd.

(57) ABSTRACT

A coated wire suitable for aerospace applications includes a metallic conductor elongated along an axis and having an outer surface extending along the axis, and three coating layers surrounding the conductor. A first coating layer is connected to the outer surface of the conductor and extends along the axis to surround the conductor, and the first coating layer is formed of ethene-tetrafluoroethene. A second coating layer is connected to the first coating layer and extends along the axis to surround the first coating layer, and the second coating layer is formed of polyaryletherketone. A third coating layer is connected to the second coating layer and extends along the axis to surround the third coating layer, wherein the third coating layer is formed of ethene-tetrafluoroethene. The three coating layers may each be continuous and seamless extruded layers in one configuration.

29 Claims, 4 Drawing Sheets (51) Int. Cl.
 *B64D 27/18* (2006.01)
 *B64C 1/00* (2006.01)

(56) References Cited

U.S. PATENT DOCUMENTS

| | | |
|---|---|---|
| 2008/0128154 A1 | 6/2008 | Faust et al. |
| 2009/0121073 A1 | 5/2009 | Doane et al. |
| 2011/0212262 A1* | 9/2011 | Miyasaka ............ B29C 47/065 427/258 |

* cited by examiner

COATED WIRE

TECHNICAL FIELD

The present invention generally relates to a coated wire, and more specifically, to a coated wire with a multi-layer coating that may be extruded and provides good durability and performance for applications such as aerospace.

BACKGROUND

Wiring used in aerospace applications must meet rigorous performance criteria, including durability, wear resistance, chemical resistance, arc resistance, and resistance to fluid ingress, and these criteria must be met both at ambient temperature and at elevated temperatures, e.g., 150-200° C. Failure of any of these criteria in flight could be catastrophic, leading to property damage and/or loss of life. Other beneficial properties for wiring used in aerospace applications include markability, good conductivity, and light weight. The coatings used on the conductor portions of the wires can have a significant effect on the performance of the wire according to all these criteria.

Existing aerospace wiring suffers from several drawbacks. For example, wires with extruded ETFE coatings may provide insufficient resistance to abrasion and cut through, particularly at elevated temperatures. As another example, wires coated with a composite tape wrap (e.g., polyimide alone or with a PTFE layer) often fail to provide sufficient sealing due to seams inherent in wrapping the tape. The use of an additional PTFE layer also can result in tearing during installation and reduced markability. Further, such composite tapes must be heated to improve sealing during installation, and this heating is performed at elevated temperatures that preclude the use of certain conductor materials that may be damaged by such temperatures (e.g., a tin-coated conductor). Additional drawbacks and advantages of existing aerospace wires and manufacturing methods are recognized by those skilled in the art.

The present disclosure seeks to overcome certain of these limitations and other drawbacks of existing aerospace wires and manufacturing methods, and to provide new features not heretofore available.

BRIEF SUMMARY

The following presents a general summary of aspects of the invention in order to provide a basic understanding of the invention. This summary is not an extensive overview of the invention. It is not intended to identify key or critical elements of the invention or to delineate the scope of the invention. The following summary merely presents some concepts of the invention in a general form as a prelude to the more detailed description provided below.

Aspects of the present disclosure relate to a coated wire that includes a metallic conductor elongated along an axis and having an outer surface extending along the axis, and three coating layers surrounding the conductor. A first coating layer is connected to the outer surface of the conductor and extends along the axis to surround the conductor, and the first coating layer is formed of ethene-tetrafluoroethene (ETFE). A second coating layer is connected to the first coating layer and extends along the axis to surround the first coating layer, and the second coating layer is formed of polyaryletherketone (PAEK). A third coating layer is connected to the second coating layer and extends along the axis to surround the third coating layer, wherein the third coating layer is formed of ETFE. The three coating layers may each be continuous and seamless extruded layers in one configuration.

According to one aspect, the first coating layer has a thickness of 0.001 to 0.004 inch, the second coating layer has a thickness of 0.001 to 0.010 inch, and the third coating layer has a thickness of 0.001 to 0.010 inch. The first, second, and third coating layers may have a combined thickness of 0.006 to 0.015 inch.

According to another aspect, the first, second, and third coating layers each have a elongation that is 100% or greater. The elongation of some or all of the coating layers may be 125% or greater, and at least the second layer may have an elongation of 125% or greater, or at least 150% or greater.

Additional aspects of the disclosure relate to a coated wire including a metallic conductor elongated along an axis and having an outer surface extending along the axis, with the metallic conductor having a multi-layer coating. The coating includes a first coating layer connected to the outer surface of the conductor and extending along the axis to surround the metallic conductor, a second coating layer connected to the first coating layer and extending along the axis to surround the first coating layer, and a third coating layer connected to the second coating layer and extending along the axis to surround the second coating layer. The first coating layer has a thickness of 0.001 to 0.004 inch, the second coating layer has a thickness of 0.001 to 0.010 inch, and the third coating layer has a thickness of 0.001 to 0.010 inch. The first, second, and third coating layers are each continuous and seamless extruded layers, and the first coating layer is formed of ETFE or polytetrafluoroethylene (PTFE), the second coating layer is formed of PAEK or polyimide, and the third coating layer is formed of ETFE or PTFE. Both the first and third layers may be formed of ETFE in one configuration. The multi-layer coating may have a combined thickness of 0.006 to 0.015 inch.

According to another aspect, the first, second, and third coating layers each have a elongation that is 100% or greater. The elongation of some or all of the coating layers may be 125% or greater, and at least the second layer may have an elongation of 125% or greater, or at least 150% or greater.

Further aspects of the disclosure relate to an aircraft that includes an aircraft body having an engine configured to supply power to transport the aircraft body in flight, and a plurality of components connected by electrical wiring. The electrical wiring includes at least one coated wire according to aspects as described herein.

Still further aspects of the disclosure relate to a method of manufacturing a coated wire according to aspects described herein. The method may include providing a metallic conductor elongated along an axis and having an outer surface extending along the axis, and coating the outer surface of the metallic conductor with a multi-layer coating to form the coated wire, using an extrusion process. The multi-layer coating includes a first coating layer of ETFE connected to the outer surface of the metallic conductor and extending along the axis to surround the metallic conductor, a second coating layer of PAEK connected to the first coating layer and extending along the axis to surround the first coating layer, and a third coating layer of ETFE connected to the second coating layer and extending along the axis to surround the second coating layer. The coated wire is then cooled after the extrusion process. The resultant coated wire may have any of the properties described herein.

According to one aspect, the extrusion process includes at least first and second extrusion passes, where the first coating layer is extruded in the first extrusion pass and at least the second coating layer is extruded in the second extrusion pass. The first extrusion pass is performed at a first extrusion temperature and the second extrusion pass is performed at a second extrusion temperature, where the first extrusion temperature is lower than the second extrusion temperature. For example, the first extrusion temperature may be about 550° F. or no greater than 600° F., and the first extrusion temperature may be at least 100° F. or at least 150° F. lower than the second extrusion temperature. The metallic conductor may be a tin-coated conductor in one configuration. The extrusion process may further include a third extrusion pass, where the third coating layer is extruded in the third extrusion pass.

Other features and advantages of the disclosure will be apparent from the following description taken in conjunction with the attached drawings.

BRIEF DESCRIPTION OF THE DRAWINGS

To understand the present invention, it will now be described by way of example, with reference to the accompanying drawings in which.

DETAILED DESCRIPTION

While this invention is capable of embodiment in many different forms, there are shown in the drawings, and will herein be described in detail, certain embodiments of the invention with the understanding that the present disclosure is to be considered as an example of the principles of the invention and is not intended to limit the broad aspects of the invention to the embodiments illustrated and described.

Figure 1:
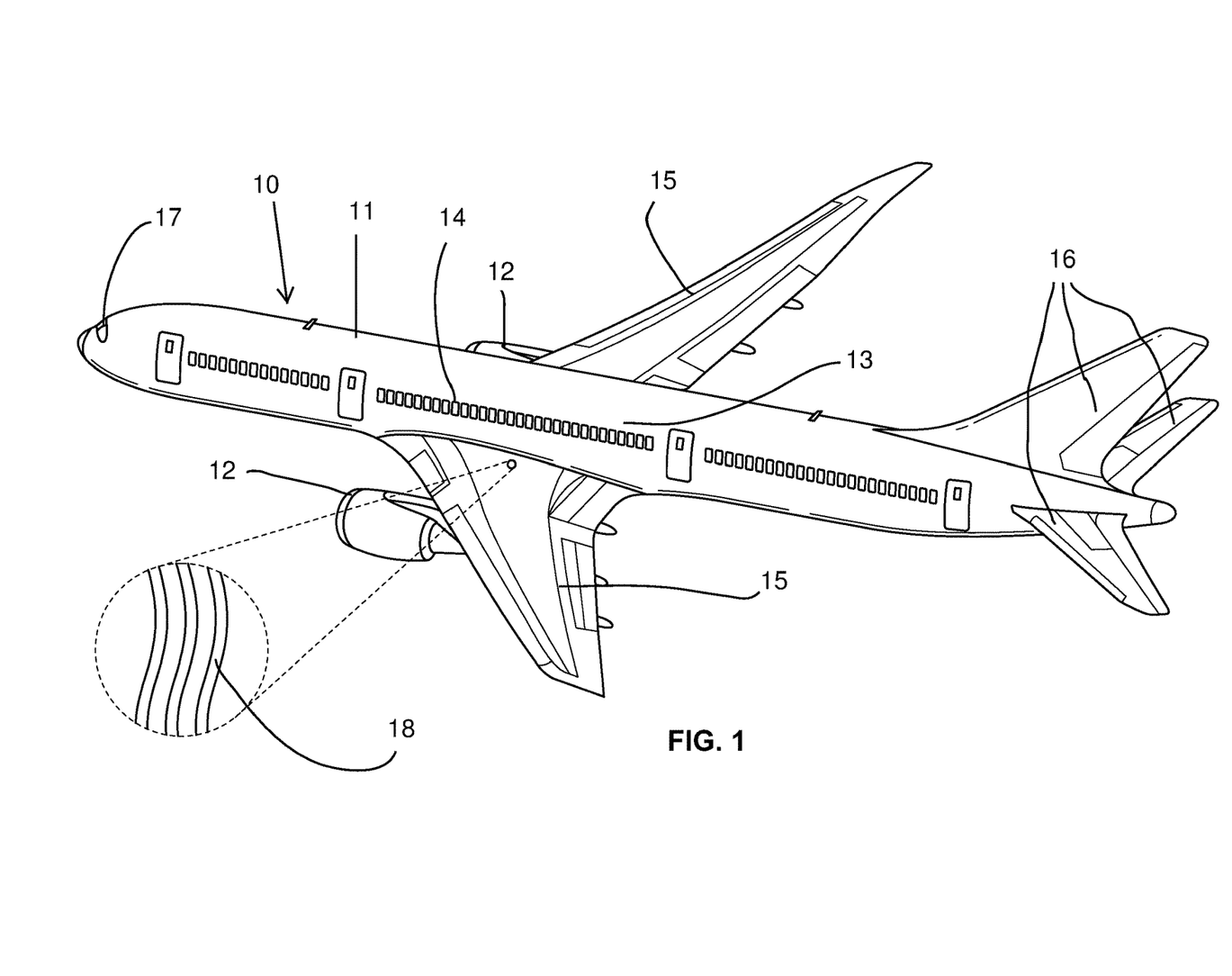
FIG. 1 is a schematic view illustrating one embodiment of an aircraft that includes one or more coated wires according to aspects of the disclosure, with a magnified section illustrating internal detail.

Referring to the figures, and initially to FIG. 1, there is shown one embodiment of an aircraft 10 in the form of a passenger airplane. The aircraft 10 generally includes an aircraft body 11 and at least one engine 12 configured to supply power to transport the aircraft body 11 in flight. The aircraft 10 in the form of a passenger airplane as shown in FIG. 1 has a fuselage 13 that houses a passenger compartment 14 for holding one or more passengers, as well as two wings 15, two wing-mounted propulsion engines 12 (e.g., jet, propeller, or other engine types), stabilizers 16, and a landing gear (not shown). The passenger compartment 14 further includes a cockpit 17, and the aircraft 10 may have other typical components as known in the art, including various mechanical and/or electrical components for operation of the aircraft 10, controlling and/or monitoring various components, navigation, communications, and providing safety and comfort to the crew and passengers, among other functions. The aircraft 10 has electrical wiring 18 connecting these various components to each other, as shown schematically in the magnified window in FIG. 1. While a passenger airplane is shown by way of example, nearly any type of aircraft 10 may be used in connection with the principles disclosed herein, including (without limitation), a military plane, a helicopter, an airship, a spacecraft, a glider, or an unmanned aircraft (UAV), among others. It is understood that other types of aircraft may include different components, and that wiring 18 may connect such various components.

Figure 2:
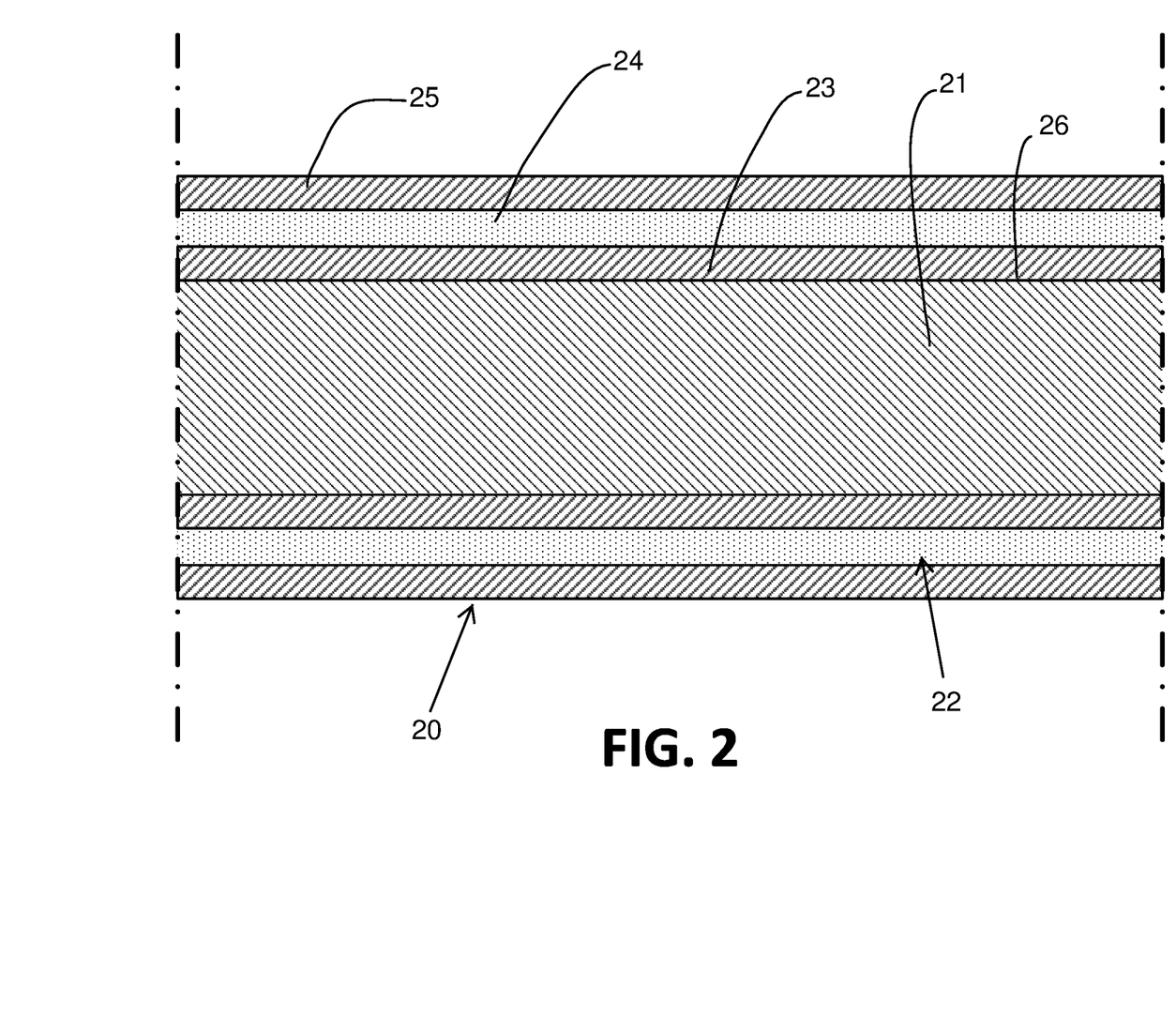
FIG. 2 is a cross-section view of one embodiment of a coated wire according to aspects of the disclosure, taken along an axial direction.
Figure 3:
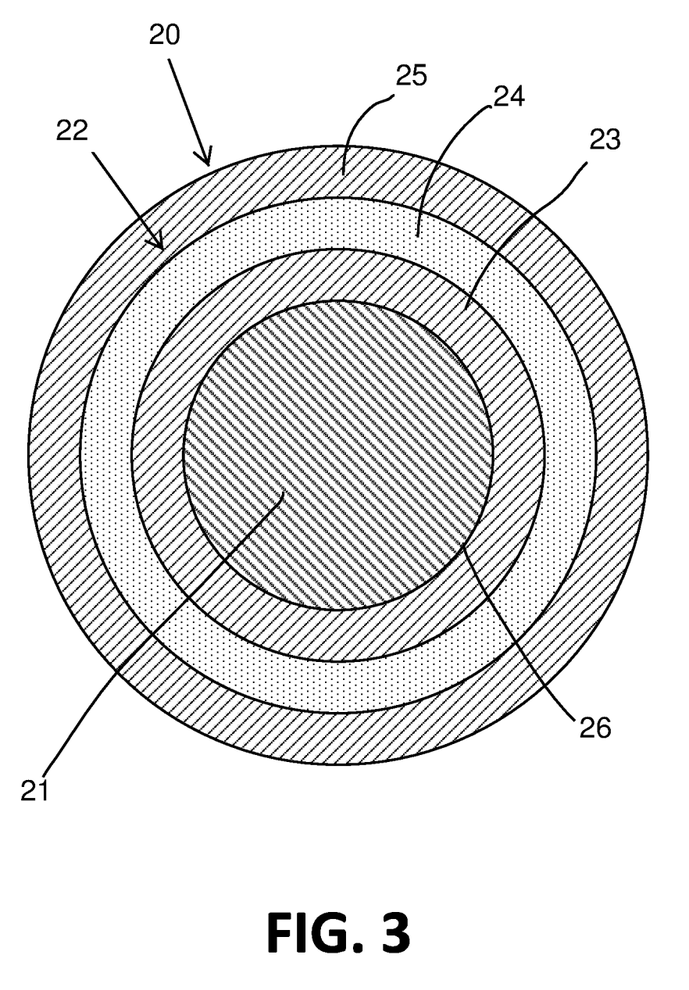
FIG. 3 is a cross-section view of the coated wire of FIG. 2, taken perpendicular to the axial direction.

The wiring 18 used in an aircraft 10 as described herein may include one or more coated wires 20 that are generally provided with a multi-layer coating. One illustrative embodiment of a coated wire 20 according to aspects of the disclosure is shown in FIGS. 2-3, and includes a conductor 21 with a multi-layer coating 22 that has a plurality of coating layers 23, 24, 25. The conductor 21 in this embodiment is a metallic wire that may be made from one or more metallic materials, such as copper, aluminum, tin, silver, gold, or other metals, or alloys of such metals. It is understood that the term "metallic materials" includes metal alloys, which may contain one or more non-metallic alloying elements. The conductor 21 may be a unitary and/or monolithic structure in one embodiment, or may include multiple materials and/or separate structures in another embodiment. For example, the conductor 21 may be formed of a first metallic material with one or more coatings of additional metallic material(s), such as a tin-coated copper conductor, a silver-coated copper conductor, or a nickel-coated copper conductor. It is understood that "copper" in these materials may include copper alloys. As another example, the conductor 21 may be formed from multiple filaments connected together, such as by braiding, twisting, fusing, etc. The conductor 21 may be formed of a non-metallic or not entirely metallic conductive material in a further embodiment.

The multi-layer coating 22 in the embodiment of FIGS. 2-3 has the three layers 23, 24, 25 forming successive coatings that extend axially along the length of the conductor 21. In this configuration, the first or inner layer 23 is connected to the outer surface 26 of the conductor 21 and extends along the length of the axis to surround the conductor 21 along the entire or substantially entire length of the conductor 21, the second or middle layer 24 is connected to the inner layer 23 and extends along the axis to surround the inner layer 23 along the entire or substantially entire length of the conductor 21, and the third or outer layer 25 is connected to the middle layer 24 and extends along the axis to surround the middle layer 24 along the entire or substantially entire length of the conductor 21. The inner layer 23 in the embodiment of FIGS. 2-3 is the innermost layer in contact with the conductor 21, and the outer layer 25 in this embodiment is the outermost layer and is exposed to the environment. It is understood that the layers 23, 24, 25 described herein may be present in the multi-layer coating 22 along with additional layers in other embodiments. Such additional layers may be located inside the inner layer 23, outside the outer layer 25, and/or interspersed between the layers. For example, in various embodiments, the middle layer 24 may be one of multiple "middle" layers or the inner and/or outer layers 23, 25 may not be the innermost or outermost layers.

The three layers 23, 24, 25 of the multi-layer coating 22 in the embodiment of FIGS. 2-3 each have a thickness of at least 0.001 inch, and the thickness of each layer 23, 24, 25 may depend on the material of the layer, the properties of the material, and the desired properties of the layer. The entire multi-layer coating 22 in this embodiment has a thickness of 0.006-0.015 inch. In one example embodiment, each of the three layers 23, 24 25 has a thickness of 3 mils or 0.003 inch. The multi-layer coating 22 may have a different number of layers, and the layers 23, 24, 25 and the coating 22 as a whole may have different thicknesses, in other embodiments. All of the layers 23, 24, 25 of the coating 22 are generally formed of non-metallic and/or insulative materials, and some or all of the layers 23, 24, 25 may be formed of polymer materials in one embodiment. The materials of all of the layers 23, 24, 25 may have high ductility in one embodiment, such as having an elongation of at least 100%, and some or all of the layers may have an elongation of at least 125% or even 150% in some embodiments. The elongation figures specified herein are tensile elongation figures at room temperature, measured until breakage, unless otherwise noted. This high degree of elongation of the materials of the layers 23, 24, 25 can increase resistance to stress cracking that may occur over time. The layers 23, 24, 25 may additionally all be made from materials that have a tensile strength of at least 4000 psi, in one embodiment. The multi-layer coating 22 may include additional materials, such as adhesives or other bonding materials, surface treatments, dyes, inks, paints, etc., and such additional materials may have a thickness of less than 0.001 inch.

The first or inner layer 23 may be formed of poly(ethene-co-tetrafluoroethene), also known as ethylene tetrafluoroethylene or ETFE, in one embodiment. The ETFE may be a cross-linked ETFE. FIGS. 2-3 illustrate the inner layer 23 being a continuous and seamless coating directly connected to the outer surface 26 of the conductor 21, such as by extrusion in one embodiment. An example of extrusion of one or more layers on a conductor 21 is described in greater detail herein and illustrated in FIG. 4. In various embodiments, the inner layer 23 may have a thickness of 0.001 inch to 0.004 inch and/or an elongation of at least 100% or at least 125%. An inner layer 23 of ETFE with this structure can provide arc resistance and sealing for the conductor 21, as well as a connection surface for the middle layer 24 and heat insulation of the conductor 21 during extrusion of additional layers 24, 25. In other embodiments, the inner layer 23 may be formed of a different material, potentially using a different method for coating the conductor 21, and/or the inner layer 23 may have a different structure. For example, the inner layer 23 may be made from polytetrafluoroethylene (PTFE) in another embodiment, which may be coated on the conductor 21 using an extrusion process. Further different materials may be used in additional embodiments.

The second or middle layer 24 may be formed of polyaryletherketone, also known as PAEK, in one embodiment. FIGS. 2-3 illustrate the middle layer 24 as being a continuous and seamless coating directly connected to the inner layer 23, such as by extrusion in one embodiment. In various embodiments, the middle layer 24 may have a thickness of 0.001 inch to 0.010 inch and/or an elongation of at least 100%, at least 125%, or at least 150%. A middle layer 24 of PAEK with this structure can provide food durability and strong resistance to abrasion and cut-through at room temperature and at elevated temperatures such as 150-200° C. The high degree of elongation of the PAEK material also increases resistance to stress cracking that may occur over time, particularly in tight installations, providing further protection against damage to the wire and shorting. In other embodiments, the middle layer 24 may be formed of a different material, potentially using a different method for application, and/or the middle layer 24 may have a different structure. For example, the middle layer 24 may be made from a polyimide material in another embodiment, which may be coated on the inner layer 23 using an extrusion process. The PAEK may be fiber reinforced (e.g., glass or carbon) in one embodiment. Further different materials may be used in additional embodiments.

The third or outer layer 25 may also be formed of ETFE in one embodiment, which may be a cross-linked ETFE. FIGS. 2-3 illustrate the outer layer 25 being a continuous and seamless coating directly connected to the middle layer 24, such as by extrusion in one embodiment. In various embodiments, the outer layer 25 may have a thickness of 0.001 inch to 0.010 inch and/or an elongation of at least 100% or at least 125%. An outer layer 25 of ETFE with this structure can provide resistance to attack and/or penetration by chemicals and fluids, enhanced sealing, resistance to tearing, and good markability (e.g., by inkjet or laser marking). In other embodiments, the outer layer 25 may be formed of a different material, potentially using a different method for application, and/or the outer layer 25 may have a different structure. For example, the outer layer 25 may be made from PTFE in another embodiment, which may be coated on the middle layer 24 using an extrusion process. However, the use of PTFE may negatively affect markability. Further different materials may be used in additional embodiments, and the inner and outer layers 23, 25 may be made from the same material or different materials in such embodiments.

Figure 4:
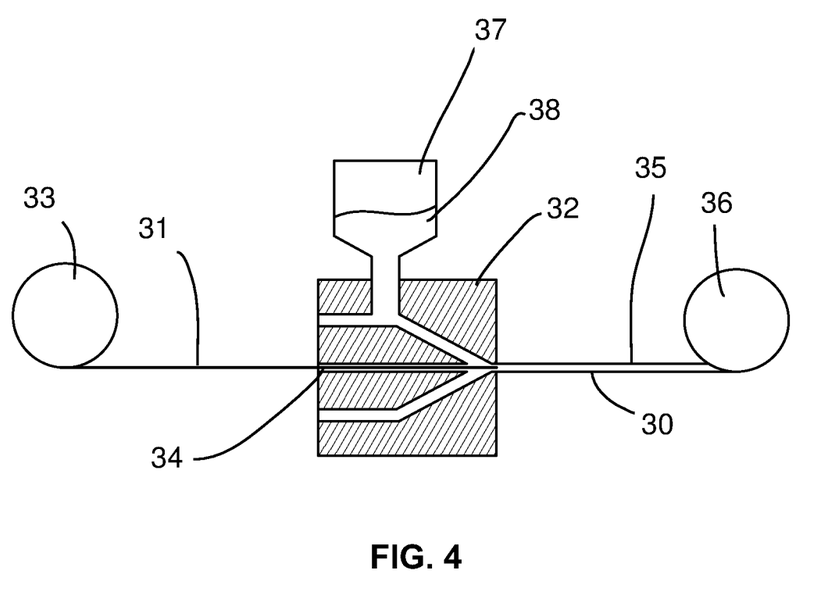
FIG. 4 is a schematic view illustrating one embodiment of an extrusion process for forming a coated wire according to aspects of the disclosure.

A coated wire 20 as shown in FIGS. 2-3, or differently configured coated wires according to other embodiments described herein, may be manufactured using a variety of processes. A conductor 21 with a multi-layer coating 22 with one or more layers that are continuous and seamless may be manufactured using an extrusion process, such as a melt extrusion process. An example of a melt extrusion process is schematically illustrated in FIG. 4. The process illustrated in FIG. 4 is configured for extrusion of a single coating layer 30 onto a filament 31, which may be a bare wire or a wire with at least one coating already applied. Multiple coating layers 30 can be extruded using layer-by-layer repetition of single-layer extrusion processes or by a more complex multi-layer extrusion process, or combinations of such processes. It is understood that FIG. 4 illustrates an extrusion process schematically and by way of example, and therefore, additional and/or more complex equipment and processing parameters may be used in practice. In other embodiments, one or more layers may be formed using a different type of extrusion process or another (non-extrusion) process.

FIG. 4 illustrates a melt extrusion process configured for extrusion of a single coating layer 30 onto a filament 31 using an extrusion die 32. The process in FIG. 4 generally involves a filament supply, such as a supply roll 33, that provides a continuous feed of the filament 31 through a central passage 34 of the extrusion die 32, where the coating layer 30 is formed on the filament 31 to create a coated product 35, and a product repository, such as a collection roll 36 to collect the product 35. The extrusion die 32 in this embodiment is in communication with a supply 37 of the coating material 38, such as a vat, reservoir, hopper, etc. The supply 37 provides a feed of the coating material 38 (e.g., a polymer resin) to the extrusion die 32 to be applied in molten form to create the coating layer 30 on the filament 31. The coating material 38 cools after exiting the die 32 to form the coating layer 30. The coating material 38 may be fed to the die 32 from the supply 37 in molten form in one embodiment, or may be fed to the die 32 in solid form and melted by heating the die 32 or melted between the supply 37 and the die 32 in other embodiments. It is understood that the temperature of the extrusion process may be dependent on the properties of the coating material 38.

The coated wire 20 illustrated in FIGS. 2-3 may be formed by extrusion in one embodiment, using layer-by-layer repetition of single-layer extrusion processes or by a more complex multi-layer extrusion process, or combinations of such processes, as described above. It is understood that the number and design of the extrusion processes is sufficient to create all desired layers. In one embodiment, the extrusion process includes at least two extrusion passes, wherein the inner layer 23 is extruded in the first extrusion pass and at least the middle layer 24 is extruded in the second extrusion pass. The outer layer 25 in this embodiment may be extruded in third extrusion pass or in the second pass. The first extrusion pass may be done at a lower temperature than the second extrusion pass and/or the third extrusion pass in this embodiment, such as at least 100° F. lower or at least 150° F. lower. For example, the first extrusion pass may be performed at a temperature of about 550° F. and/or no greater than 600° F., while the second extrusion pass may be performed at a temperature of about 700° F. or higher (e.g., 710° F.). The use of ETFE for the inner layer 23 enables the use of this lower temperature in the first pass, as extrusion of PAEK requires higher temperatures. Additionally, the inner layer 23 can insulate the conductor 21 from the higher temperatures of the second extrusion pass, so that the conductor 21 does not reach high temperatures for an extended time period. This insulation, in turn, enables the use of a wider range of materials for the conductor 21, which may be damaged by exposure to higher temperatures. As one example, the use of the inner layer 23 of ETFE that is extruded at a lower temperature enables the use of a tin-coated conductor 21 (e.g., tin-coated copper), which would be damaged by extrusion temperatures of 700° F. or higher. Such tin-coated conductor 21 may likewise be unsuitable for use with tape-wrap wire coatings, which require high temperatures for application.

In another embodiment, a coated wire 20 as illustrated in FIGS. 2-3 may be produced using a tin-coated conductor 21 through an extrusion process that includes extruding one or more layers on the outer surface 26 of the wire during a first extrusion pass at a first extrusion temperature, and then extruding one or more additional layers during a second extrusion pass at a second, higher extrusion temperature. The first extrusion pass may be performed at a temperature of at least 100° F. or at least 150° F. less than the higher temperature of the second extrusion pass, for example, performing the first pass at about 550° F. and/or no greater than 600° F., and performing the second pass at about 700° F. higher, as described above. At least one layer in the first extrusion pass may be formed of ETFE, and at least one layer in the second extrusion pass may be formed of PAEK, as described herein. Alternate materials described herein may be used. It is understood that the process may utilize additional extrusion passes, which may be performed after the second pass or between the first and second passes.

A coated wire 20 and methods for production of such a coated wire 20 according to the aspects described herein provide multiple advantages over existing wires and production methods. For example, the coated wire 20 and production methods permit the use of tin-coated conductor, which may not be possible with existing extruded coatings and other wire coatings such as composite tape wrap. As another example, the coated wire 20 with the multi-layer coating 22 provides improved resistance to cut-through and abrasion as compared to existing extruded coatings, such as an ETFE coating, particularly at elevated temperatures. As a further example, the coated wire 20 with the continuous and seamless multi-layer coating 22 provides improved sealing relative to composite tape coatings, as well as avoids tearing issues that may occur with such tape coatings. As yet another example, the use of an outer ETFE coating provides improved markability in comparison to existing coatings that use PTFE, such as composite tape coatings. Still further benefits and advantages are recognizable to those skilled in the art.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. The terms "first," "second," etc., as used herein, are intended for illustrative purposes only and do not limit the embodiments in any way. In particular, these terms do not imply any order or position of the components modified by such terms. Additionally, the term "plurality," as used herein, indicates any number greater than one, either disjunctively or conjunctively, as necessary, up to an infinite number. Further, "providing" an article or apparatus, as used herein, refers broadly to making the article available or accessible for future actions to be performed on the article, and does not connote that the party providing the article has manufactured, produced, or supplied the article or that the party providing the article has ownership or control of the article. Accordingly, while specific embodiments have been illustrated and described, numerous modifications come to mind without significantly departing from the spirit of the invention.

What is claimed is:

1. A coated wire comprising:
    a metallic conductor elongated along an axis and having an outer surface extending along the axis;
    a first coating layer connected to the outer surface of the metallic conductor and extending along the axis to surround the metallic conductor, wherein the first coating layer is formed of cross-linked ethene-tetrafluoroethene;
    a second coating layer connected to the first coating layer and extending along the axis to surround the first coating layer, wherein the second coating layer is formed of polyaryletherketone; and
    a third coating layer connected to the second coating layer and extending along the axis to surround the third coating layer, wherein the third coating layer is formed of cross-linked ethene-tetrafluoroethene.

2. The coated wire of claim 1, wherein the first coating layer has a thickness of 0.001 to 0.004 inch, the second coating layer has a thickness of 0.001 to 0.010 inch, and the third coating layer has a thickness of 0.001 to 0.010 inch.

3. The coated wire of claim 2, wherein the first, second, and third coating layers have a combined thickness of 0.006 to 0.015 inch.

4. The coated wire of claim 1, wherein the first, second, and third coating layers are each continuous and seamless extruded layers.

5. The coated wire of claim 1, wherein the first, second, and third coating layers each have an elongation that is greater than 100%.

6. The coated wire of claim 5, wherein the elongation of the second coating layer is at least 125%.

7. A coated wire comprising:
a metallic conductor elongated along an axis and having an outer surface extending along the axis, the metallic conductor having a multi-layer coating comprising a first coating layer connected to the outer surface of the metallic conductor and extending along the axis to surround the metallic conductor, the first coating layer having a thickness of 0.001 to 0.004 inch, a second coating layer connected to the first coating layer and extending along the axis to surround the first coating layer, the second coating layer having a thickness of 0.001 to 0.010 inch, and a third coating layer connected to the second coating layer and extending along the axis to surround the second coating layer, wherein the third coating layer has a thickness of 0.001 to 0.010 inch,
wherein the first, second, and third coating layers are each continuous and seamless extruded layers, wherein the first coating layer is formed of cross-linked ethene-tetrafluoroethene, the second coating layer is formed of polyaryletherketone or polyimide, and the third coating layer is formed of cross-linked ethene-tetrafluoroethene.

8. The coated wire of claim 7, wherein the multi-layer coating has a combined thickness of 0.006 to 0.015 inch.

9. The coated wire of claim 7, wherein the first, second, and third coating layers each have an elongation that is greater than 100%.

10. The coated wire of claim 9, wherein the elongation of the second coating layer is at least 125%.

11. An aircraft comprising:
an aircraft body having an engine configured to supply power to transport the aircraft body in flight, and a plurality of components connected by electrical wiring, wherein the electrical wiring includes at least one coated wire comprising:
a metallic conductor elongated along an axis and having an outer surface extending along the axis;
a first coating layer connected to the outer surface of the metallic conductor and extending along the axis to surround the metallic conductor, wherein the first coating layer is formed of cross-linked ethene-tetrafluoroethene;
a second coating layer connected to the first coating layer and extending along the axis to surround the first coating layer, wherein the second coating layer is formed of polyaryletherketone; and
a third coating layer connected to the second coating layer and extending along the axis to surround the second coating layer, wherein the third coating layer is formed of cross-linked ethene-tetrafluoroethene.

12. The aircraft of claim 11, wherein the first coating layer has a thickness of 0.001 to 0.004 inch, the second coating layer has a thickness of 0.001 to 0.010 inch, and the third coating layer has a thickness of 0.001 to 0.010 inch.

13. The aircraft of claim 12, wherein the first, second, and third coating layers have a combined thickness of 0.006 to 0.015 inch.

14. The aircraft of claim 11, wherein the first, second, and third coating layers are each continuous and seamless extruded layers.

15. The aircraft of claim 11, wherein the first, second, and third coating layers each have an elongation that is greater than 100%.

16. The aircraft of claim 15, wherein the elongation of the second coating layer is at least 125%.

17. A method of manufacturing a coated wire comprising:
providing a metallic conductor elongated along an axis and having an outer surface extending along the axis;
coating the outer surface of the metallic conductor with a multi-layer coating to form the coated wire, using an extrusion process, wherein the multi-layer coating comprises:
a first coating layer of cross-linked ethene-tetrafluoroethene connected to the outer surface of the metallic conductor and extending along the axis to surround the metallic conductor;
a second coating layer connected to the first coating layer and extending along the axis to surround the first coating layer, wherein the second coating layer is formed of polyaryletherketone; and
a third coating layer connected to the second coating layer and extending along the axis to surround the second coating layer, wherein the third coating layer is formed of cross-linked ethene-tetrafluoroethene; and
cooling the coated wire after the extrusion process.

18. The method of claim 17, wherein the first coating layer has a thickness of 0.001 to 0.004 inch, the second coating layer has a thickness of 0.001 to 0.010 inch, and the third coating layer has a thickness of 0.001 to 0.010 inch.

19. The method of claim 18, wherein the multi-layer coating has a combined thickness of 0.006 to 0.015 inch.

20. The method of claim 17, wherein the first, second, and third coating layers are each continuous and seamless extruded layers.

21. The method of claim 17, wherein the first, second, and third coating layers each have an elongation that is greater than 100%.

22. The method of claim 17, wherein the extrusion process comprises at least first and second extrusion passes, wherein the first coating layer is extruded in the first extrusion pass and at least the second coating layer is extruded in the second extrusion pass.

23. The method of claim 22, wherein the extrusion process further comprises a third extrusion pass, wherein the third coating layer is extruded in the third extrusion pass.

24. A method of manufacturing a coated wire, comprising:
providing a metallic conductor elongated along an axis and having an outer surface extending along the axis;
coating the outer surface of the metallic conductor with a multi-layer coating to form the coated wire, using an extrusion process, wherein the multi-layer coating comprises:
a first coating layer of ethene-tetrafluoroethene connected to the outer surface of the metallic conductor and extending along the axis to surround the metallic conductor;
a second coating layer connected to the first coating layer and extending along the axis to surround the first coating layer, wherein the second coating layer is formed of polyaryletherketone; and
a third coating layer connected to the second coating layer and extending along the axis to surround the second coating layer, wherein the third coating layer is formed of ethene-tetrafluoroethene; and
cooling the coated wire after the extrusion process,
wherein the extrusion process comprises at least first and second extrusion passes, wherein the first coating layer is extruded in the first extrusion pass and at least the second coating layer is extruded in the second extrusion pass, and wherein the first extrusion pass is performed at a first extrusion temperature and the second extrusion pass is performed at a second extrusion temperature, and wherein the first extrusion temperature is lower than the second extrusion temperature.

25. The method of claim 24, wherein the first extrusion temperature is no greater than 600° F.

26. The method of claim 24, wherein the first extrusion temperature is at least 150° F. lower than the second extrusion temperature.

27. The method of claim 24, wherein the first extrusion temperature is about 550° F.

28. The method of claim 24, wherein the first extrusion temperature is at least 100° F. lower than the second extrusion temperature.

29. The method of claim 28, wherein the metallic conductor is a tin-coated conductor.

* * * * *